United States Patent
Chen et al.

(10) Patent No.: US 8,819,139 B2
(45) Date of Patent: Aug. 26, 2014

(54) VIRTUAL DESKTOP INFRASTRUCTURE (VDI) LOGIN ACCELERATION

(71) Applicant: FutureWei Technologies, Inc., Plano, TX (US)

(72) Inventors: Pu Chen, Shenzen (CN); Guangsong Xia, Fremont, CA (US)

(73) Assignee: Futurewei Technologies, Inc., Plano, TX (US)

( * ) Notice: Subject to any disclaimer, the term of this patent is extended or adjusted under 35 U.S.C. 154(b) by 0 days.

(21) Appl. No.: 14/046,052

(22) Filed: Oct. 4, 2013

(65) Prior Publication Data

US 2014/0188982 A1    Jul. 3, 2014

Related U.S. Application Data

(63) Continuation of application No. 13/730,887, filed on Dec. 29, 2012.

(51) Int. Cl.
*G06F 15/16*    (2006.01)
*G06F 9/455*    (2006.01)
*H04L 12/28*    (2006.01)

(52) U.S. Cl.
USPC ................ 709/204; 709/203; 370/392; 718/1

(58) Field of Classification Search
None
See application file for complete search history.

(56) References Cited

U.S. PATENT DOCUMENTS

| | | | |
|---|---|---|---|
| 2010/0215280 A1* | 8/2010 | Abdo et al. | 382/224 |
| 2011/0137974 A1 | 6/2011 | Momchilov | |
| 2011/0265083 A1 | 10/2011 | Davis | |
| 2012/0151373 A1* | 6/2012 | Kominac et al. | 715/740 |
| 2013/0136125 A1* | 5/2013 | Jain et al. | 370/392 |
| 2013/0311990 A1* | 11/2013 | Tang et al. | 718/1 |

FOREIGN PATENT DOCUMENTS

| | | |
|---|---|---|
| CN | 102656578 A | 9/2012 |
| CN | 103389884 A | 11/2013 |

* cited by examiner

*Primary Examiner* — Wen-Tai Lin
(74) *Attorney, Agent, or Firm* — Futurewei Technologies, Inc.

(57) ABSTRACT

The time required to login to a remote or virtual desktop can be reduced by caching image data in a persistent memory location in-between remote desktop sessions. For instance, image data related to an image displayed on a client device during a first virtual desktop session may be cached after terminating the first virtual desktop session. The cached data can then be used to display the same image, or a correlated image, on the client device during a subsequent remote desktop session, thereby avoiding the need to re-transport the image data over a network. In a similar manner, cached image data can be shared between multiple users sharing a common local area network (LAN) in order to improve collective virtual desktop performance.

6 Claims, 6 Drawing Sheets

VIRTUAL DESKTOP INFRASTRUCTURE (VDI) LOGIN ACCELERATION

CROSS-REFERENCE TO RELATED APPLICATIONS

The present application is a continuation application of U.S. Non-Provisional patent application Ser. No. 13/730,887 filed Dec. 29, 2012 entitled "Virtual Desktop Infrastructure (VDI) Login Acceleration," which is incorporated herein by reference as if reproduced in their entirety.

TECHNICAL FIELD

The present invention relates generally to virtual desktop infrastructure (VDI) login acceleration.

BACKGROUND

Remote desktop applications allow users to access services provided by remote servers via a graphical user interface (GUI) on a local client device. One significant consideration for remote desktop applications is that performance is heavily influenced by network conditions, as the quality of user experience may suffer greatly when network conditions are poor (e.g., low connection speeds, latency, etc.). More specifically, screen images from the remote server must be transported over the network before being viewed by the user on the local device. Techniques for improving the performance of remote desktop services are desired.

SUMMARY OF THE INVENTION

Technical advantages are generally achieved, by embodiments of this disclosure which describe virtual desktop infrastructure (VDI) login acceleration.

In accordance with an embodiment, a method for providing remote desktop services is provided. In this example, the method includes displaying a first image on a client device during a first virtual desktop session, where the first virtual desktop session corresponds to a service provided by a remote server over a network. The method further includes caching data for the first image in a persistent storage location, and using the cached data to display a second image on the client device during a second virtual desktop session, where the second image is at least partially correlated with the first image. As apparatus for performing this method is also provided.

In accordance with another embodiment, another method for providing remote desktop services is provided. In this example, multiple devices connected to a common local network are service, with the method including caching image data in a persistent storage location, where the image data was used to display a first image on a first client device during a first virtual desktop session. The method further includes identifying portions of the image data in accordance with a correlation between the first image and a second image, and sending the portions of the image data to a second client device, where the portions of the image data are used to display the second image on the second client device during a second remote desktop session. An apparatus for performing this method is also provided.

BRIEF DESCRIPTION OF THE DRAWINGS

For a more complete understanding of the present disclosure, and the advantages thereof, reference is now made to the following descriptions taken in conjunction with the accompanying drawings, in which.

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF ILLUSTRATIVE EMBODIMENTS

The making and using of embodiments of this disclosure are discussed in detail below. It should be appreciated, however, that the concepts disclosed herein can be embodied in a wide variety of specific contexts, and that the specific embodiments discussed herein are merely illustrative and do not serve to limit the scope of the claims. Further, it should be understood that various changes, substitutions and alterations can be made herein without departing from the spirit and scope of this disclosure as defined by the appended claims.

One technique for improving the performance of remote desktop applications is to cache image data on the client side of the network. For instance, image data of the desktop image may be cached in volatile memory (e.g., random access memory, etc.) on the client device such that the image data does not have to be constantly re-transported across the network during a remote desktop application session. However, conventional caching is session based, and therefore only stores image data from the current session. To wit, image data cached for a given session will only be stored for so long as the given session continues its runtime operation. As such, users may experience significant delays when starting a new remote desktop session. Such delays may be particularly burdensome in a multi-user network implantation (e.g., an office environment) during high traffic periods, such as in the morning when many users may start new remote desktop sessions. Accordingly, techniques for increasing performance of remote desktop application session initialization are desired.

Disclosed herein are techniques and mechanisms that reduce delays associated with remote desktop application session initialization through caching image data in persistent (e.g., non-volatile memory) in-between sessions. For instance, in one embodiment image data from an image displayed in an initial session may be stored after the initial session is closed, and thereafter used to display that same image during initialization of a subsequent remote desktop session. In another embodiment, image data from a remote desktop session of one user may be cached in a location of a local network (e.g., local area network (LAN), or otherwise), and thereafter used to display the same or similar image during a remote desktop session of a different user. In some embodiments, the image data may be broken up into portions of data representing macroblocks of the image. In such embodiments, macro-blocks from one image may be used to display portions of a correlated image. Hence, cached data may improve remote desktop performance even when two distinct (yet correlated) images need to be displayed on the same or different user device.

Figure 1:
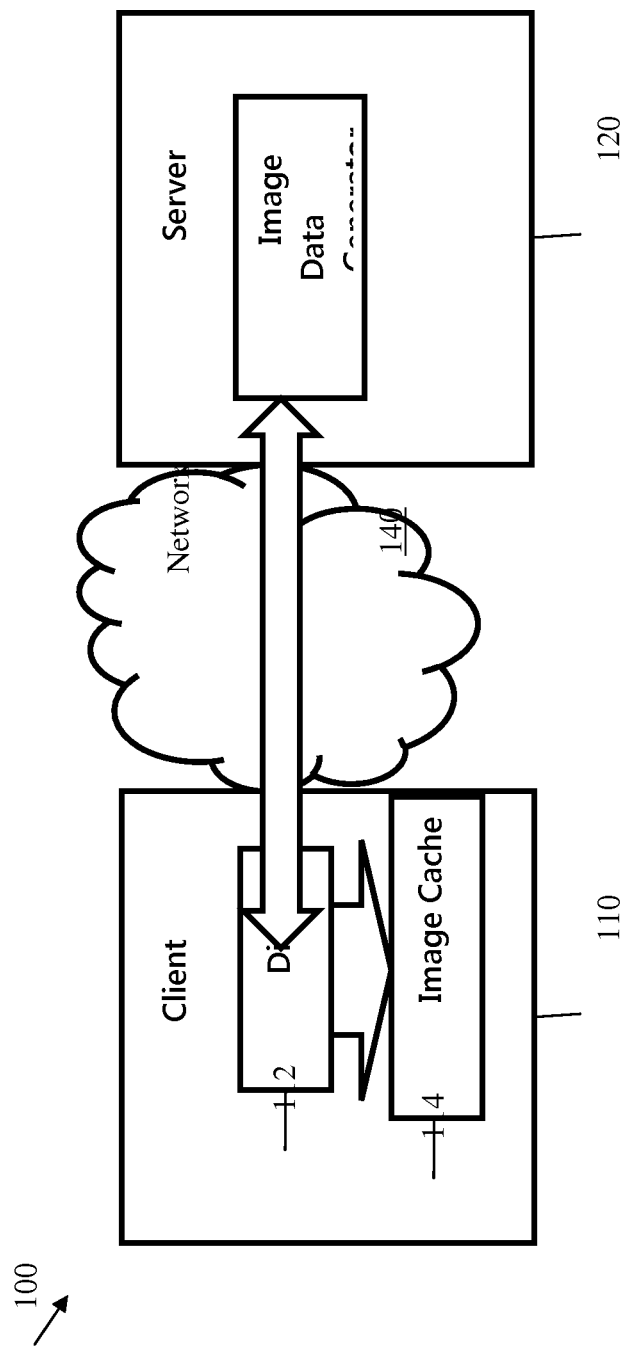
FIG. 1 illustrates a conventional network for providing remote desktop services.

FIG. 1 illustrates a conventional network 100 in which a server 120 provides remote desktop services to a client device 110. In providing the remote desktop service, the server 120 may communicate image data to the client device 110 over the network 140. The image data may be any data capable of displaying an image on the display 112 of the client device 110, including Joint Photographic Experts Group (JPEG) data, graphics interchange format (GIF) data, and others. The client device 110 may include an image cache 114, which may be used to cache image data received during a session. However, the image data may be stored in a volatile or non-persistent memory location (e.g., RAM), such that the image data is cleared from the image cache upon termination of the session. As such, redundant image data may need to be re-transported over the network 140 each time a new remote desktop session is initiated on the client device 110.

Figure 2:
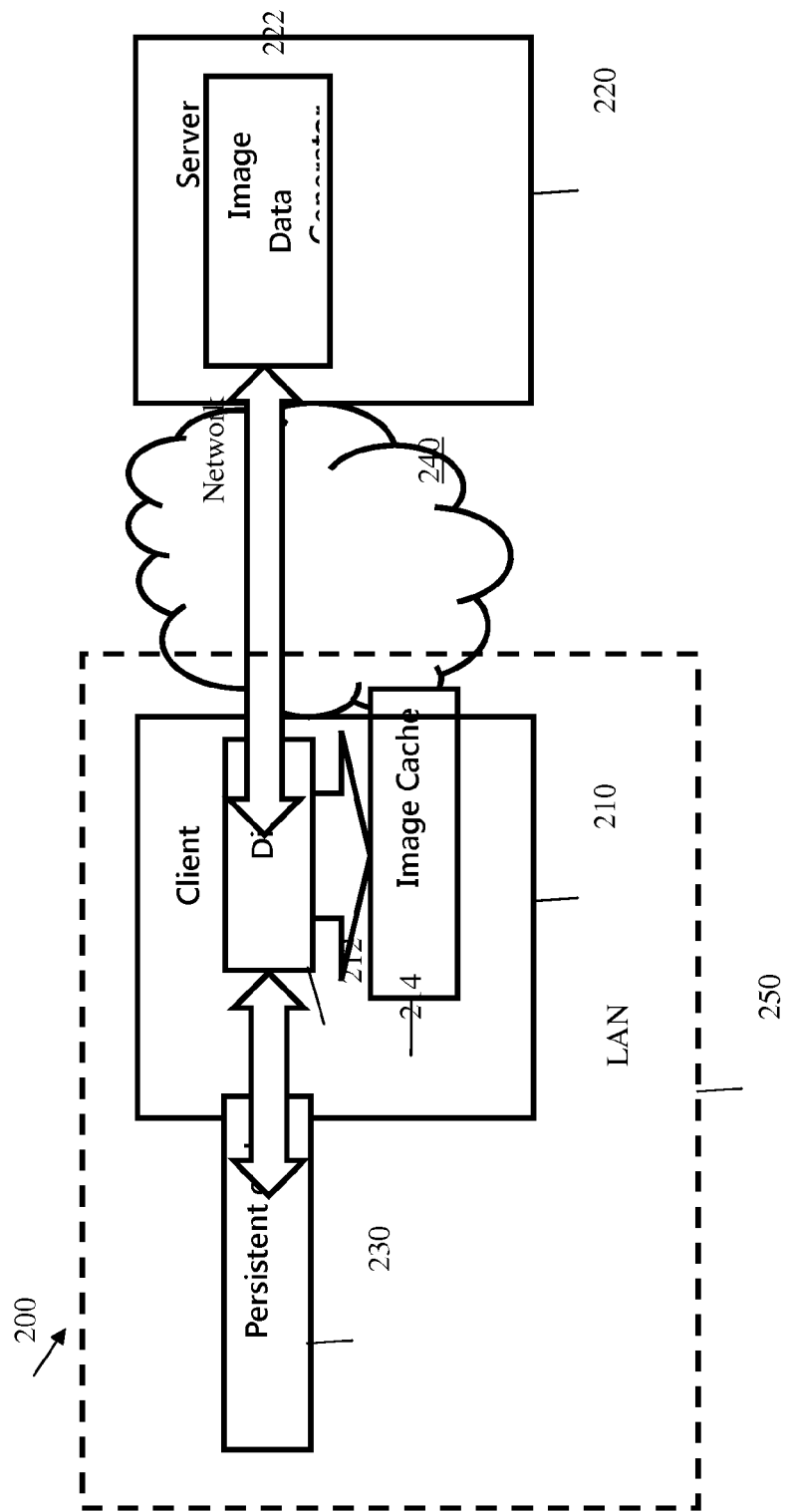
FIG. 2 illustrates an embodiment network for providing remote desktop services.

One solution may be to store the image data in a persistent cache, such that image data is stored between sessions. FIG. 2 illustrates an embodiment network 200 in which a server 220 provides remote desktop services to a client device 210 over a network 240. Unlike the network 100, the network 200 may include a persistent cache 230 for storing image data between remote desktop sessions. More specifically, image data stored in the image cache 214 may be migrated to the persistent cache 230 when a set time, e.g., when a session closes, at periodic intervals, etc. The persistent cache 230 may comprise any type of storage medium, including non-volatile or persistent storage (e.g., read only memory (ROM), etc.), and may be located on the client device 110, or in a local area network 250.

Figure 3:
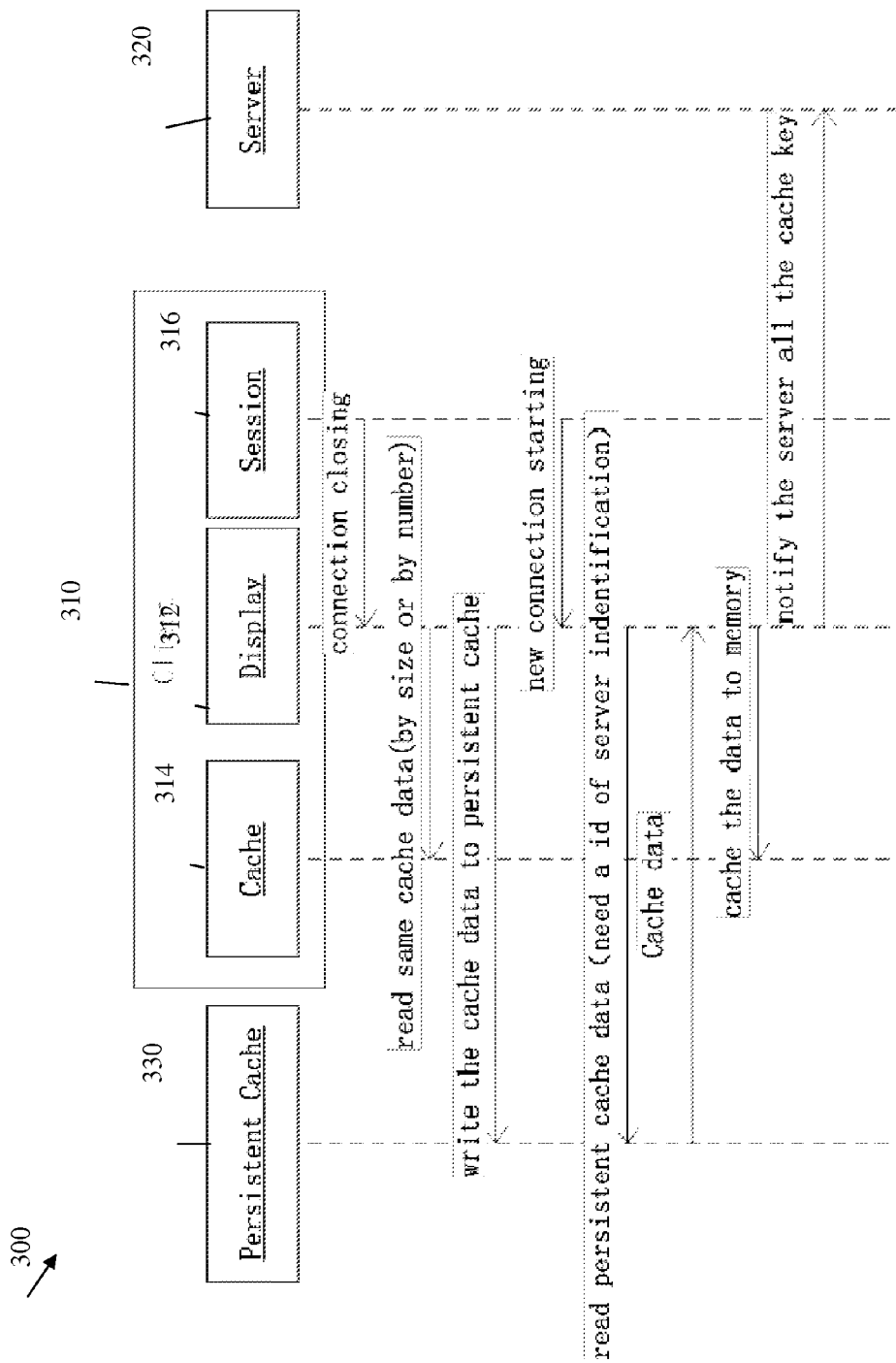
FIG. 3 illustrates a protocol diagram of a communications sequence for providing remote desktop services.

FIG. 3 illustrates a diagram of a protocol 300 for providing remote desktop services to a client 310. The protocol 300 begins when a remote desktop session 316 is closed. Thereafter, image data is read from the cache 314, and written to the persistent cache 330. Next, a new connection is started, and the image data is read from the persistent cache to the display such that the image may be shown. Notably, the image is shown without having to re-transport the image from the server 320 over a network, thereby circumventing at least some of the delay associated with conventional session initialize. Subsequently, the image data is cached in the cache memory, and the server is notified of all the cache keys.

Figure 4:
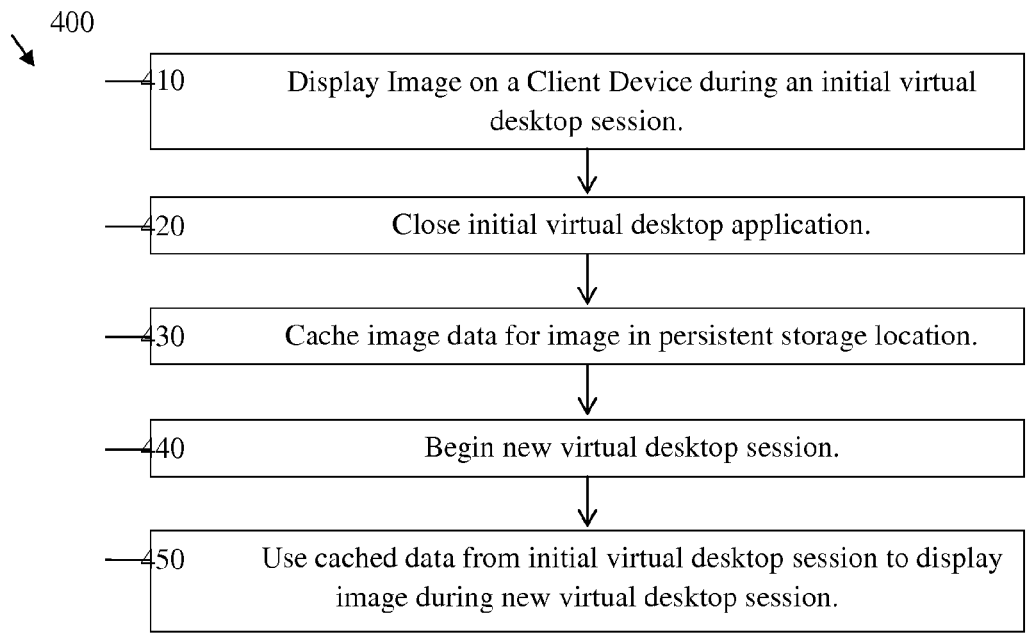
FIG. 4 illustrates a flowchart of a method for providing remote desktop services.

FIG. 4 illustrates a method 400 for providing remote desktop services in accordance with embodiments of this disclosure. The method 400 begins at step 410, where an image is displayed on a client device during an initial virtual desktop session. Next, the method 400 proceeds to step 420, where the initial virtual desktop session is closed. Subsequently, the method 400 proceeds to step 430, where image data for the image displayed during the initial virtual desktop session is cached in a persistent storage location. Thereafter, the method 400 proceeds to step 440, where a new virtual desktop session begins. Next, the method 400 proceeds to step 450, where cached data from the initial virtual desktop session is used to display the image during the new virtual desktop session.

Figure 5:
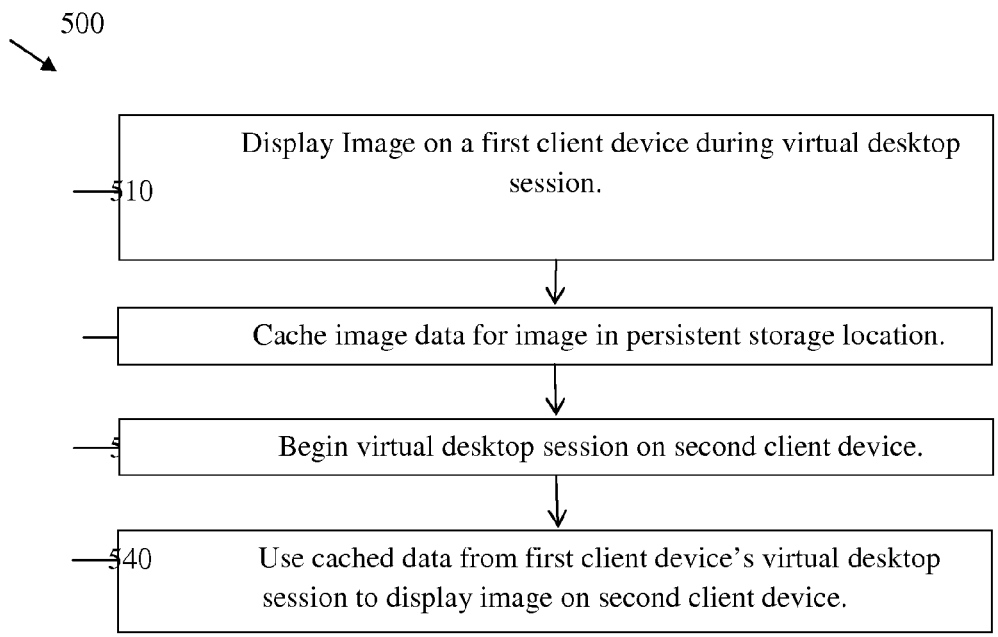
FIG. 5 illustrates a flowchart of another method for providing remote desktop services.

In some embodiments, image data from one user's virtual desktop session may be used by another user's virtual desktop session. For instance, two employees at the same company may run similar virtual desktop applications, and may utilize one another's cached image data to achieve improved virtual desktop application performance. FIG. 5 illustrates a method 500 for providing remote desktop services in accordance with embodiments of this disclosure. The method 500 begins at step 510, where an image is displayed on a first client device during a virtual desktop session. Thereafter, the method 500 proceeds to step 520, where image data relating to the image displayed on the first client device is stored in a persistent storage location. Next, the method 500 proceeds to step 530, where another virtual desktop session begins on a second client device. Subsequently, the method 500 proceeds to step 540, where cached data from the first client device's virtual desktop session is used to display an image on the second client device. Notably, the image displayed on the second client device need not be identical to the image displayed on the first client device. Instead, the images may be at least partially correlated. Further, the persistent storage location may be located in a LAN server providing access to both client devices. Alternatively, the persistent storage location may be positioned locally in one or both of the client devices.

Figure 6:
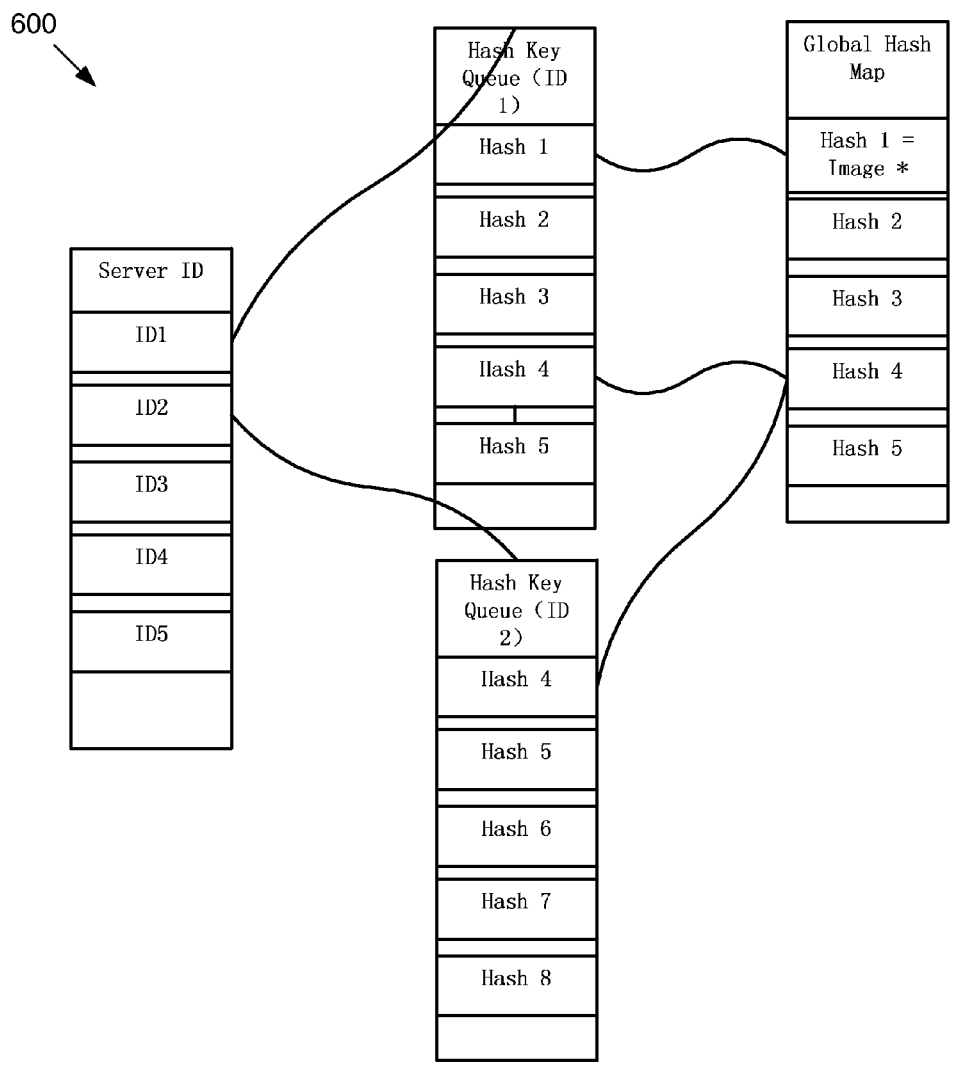
FIG. 6 illustrates a diagram of hash tables used for caching image data.

As discussed above, images may be broken down into portions (e.g., macroblocks), with the image data including data corresponding to individual macroblocks. Accordingly, the image data may be cached using a plurality of reference indexes (e.g., cyclic redundancy checks (CRCs)), such that portions of the image data may be used to display correlated portions of a separate/distinct image. Accordingly, a hash function may be applied to each portion of image data to obtain a hash value for said portions of image data. FIG. 6 illustrates an example of how distinct (yet correlated images) may share common hash values. As shown, a hash value (hash 4) is common between a hash key queue for a first image (ID1) and a hash key queue for a second image (ID2). As such, image data cached for the first image may be used to reduce the amount of image data that must be transported over the network to display the second image.

Figure 7:
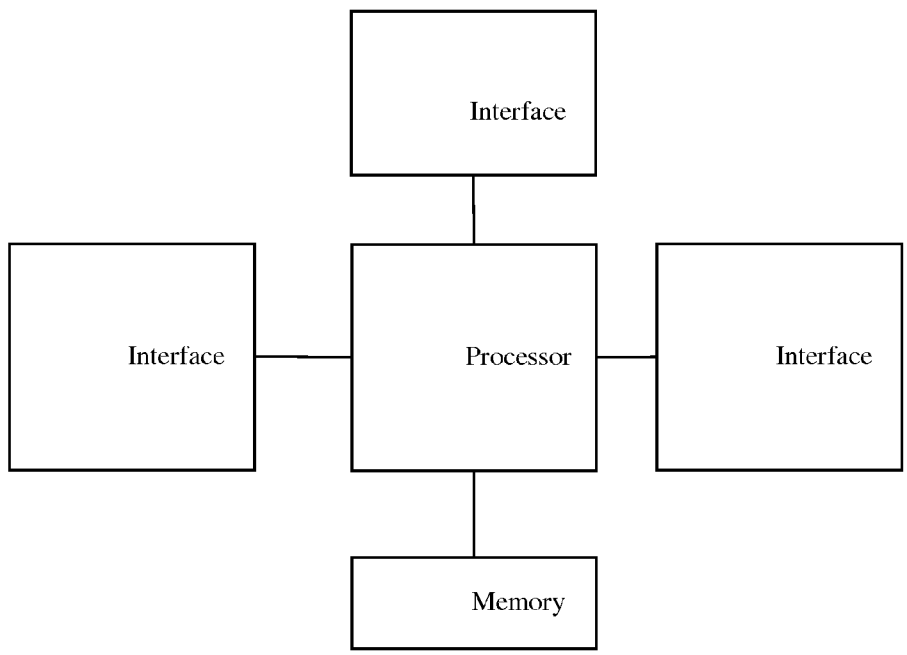
FIG. 7 illustrates a diagram of an embodiment communications device.

FIG. 7 illustrates a block diagram of an embodiment of a communications device 700, which may be equivalent to one or more devices (e.g., server, client device, LAN device, etc.) discussed above. The communications device 700 may include a processor 704, a memory 706, and a plurality of interfaces 710-714, which may (or may not) be arranged as shown in FIG. 7. The processor 704 may be any component capable of performing computations and/or other processing related tasks, and the memory 706 may be any component capable of storing programming and/or instructions for the processor 704. The interfaces 710-714 may be any components or collection of components that allow the communications device 700 to communicate with other devices.

Although the description has been described in detail, it should be understood that various changes, substitutions and alterations can be made without departing from the spirit and scope of this disclosure as defined by the appended claims. Moreover, the scope of the disclosure is not intended to be limited to the particular embodiments described herein, as one of ordinary skill in the art will readily appreciate from this disclosure that processes, machines, manufacture, compositions of matter, means, methods, or steps, presently existing or later to be developed, may perform substantially the same function or achieve substantially the same result as the corresponding embodiments described herein. Accordingly, the appended claims are intended to include within their scope such processes, machines, manufacture, compositions of matter, means, methods, or steps.

What is claimed:

1. A method for using remote virtual desktop service provided by a remote server in a network remote from a client device through a virtual desktop session, the method comprising:

initiating, by the client device, a virtual desktop session between the client device and the remote server providing the remote virtual desktop service;

identifying, by the client device, portions of virtual desktop image data in accordance with a common hash value between a hash key queue for a first virtual desktop image associated with the virtual desktop session and a hash key queue for a second virtual desktop image associated with a previous virtual desktop session which is initiated by the client device before the virtual desktop session, and wherein virtual desktop image data for the second virtual desktop image of the previous virtual desktop session is obtained and cached to a local persistent storage by dividing a plurality of portions of virtual desktop image data corresponding to a plurality of macroblocks, each of the first and second virtual desktop image comprise to a plurality of macroblocks, each of the macroblocks has an identifiers (IDs), and a hash function is applied to each portion of the virtual desktop image data to obtain a hash value for the portions of the virtual desktop image data;

obtaining, by the client device, a plurality of identifiers (IDs) associated with the first virtual desktop image;

mapping, by the client device, at least some of the plurality of IDs to the portions of the virtual desktop image data being cached in the local persistent storage;

retrieving, by the client device, the identified portions of the virtual desktop image data from the local persistent storage associate with the client device; and informing, by the client device, non-mapped ones of the plurality of IDs to the remote server, which causes the remote server to provide additional virtual desktop image data to the client device, wherein the additional virtual desktop image data is combined with the portions of the virtual desktop image data to display the first virtual desktop image on the client device during the virtual desktop session.

2. The method of claim 1, wherein the plurality of IDs comprise cyclic redundancy checks (CRCs).

3. The method of claim 1, further comprising:

caching, by the client device, the additional virtual desktop image data in the local persistent storage.

4. An apparatus for using remote virtual desktop service provided by a remote server in a network remote from a client device through a virtual desktop session, the apparatus comprising:

a memory configures to store computer executable instructions; and a processor coupled to the memory and configured to execute the computer executable instructions which causes the processor to perform operations comprising:

initiating a virtual desktop session between the client device and the remote server providing the remote virtual desktop service;

identifying portions of virtual desktop image data in accordance with a a common hash value between a hash key queue for a first virtual desktop image associated with the virtual desktop session and a hash key queue for a second virtual desktop image associated with a previous virtual desktop session which is initiated before the virtual desktop session, wherein virtual desktop image data for the second virtual desktop image of the previous virtual desktop session is obtained and cached to a local persistent storage by dividing a plurality of portions of virtual desktop image data corresponding to a plurality of macroblocks, each of the first and second virtual desktop image comprise to a plurality of macroblocks, each of the macroblocks has an identifiers (IDs), and a hash function is applied to each portion of the virtual desktop image data to obtain a hash value for the portions of the virtual desktop image data;

obtaining a plurality of identifiers (IDs) associated with the first virtual desktop image;

mapping at least some of the of the plurality of IDs to the portions of the virtual desktop image data being cached in the local persistent storage;

retrieving the identified portions of the virtual desktop image data from the local persistent storage associated with the client device; and informing non-mapped ones of the plurality of IDs to the remote server, which causes the remote server to provide additional virtual desktop image data to the client device, wherein the additional virtual desktop image data is combined with the retrieved portions of the virtual desktop image data to display the first virtual desktop image on the client device during the virtual desktop session.

5. The apparatus of claim 4, wherein the plurality of IDs comprise cyclic redundancy checks (CRCs).

6. The apparatus of claim 4, wherein the operations further comprise caching the additional virtual desktop image data in the local persistent storage.

* * * * *